(12) United States Patent
Slater et al.

(10) Patent No.: US 12,098,987 B2
(45) Date of Patent: Sep. 24, 2024

(54) RHEOMETER SYSTEMS AND RELATED METHODS

(71) Applicant: Schlumberger Technology Corporation, Sugar Land, TX (US)

(72) Inventors: Kenneth Slater, Sealy, TX (US); John Troncoso, Rosharon, TX (US); Zakhar Chizhov, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 470 days.

(21) Appl. No.: 17/309,949

(22) PCT Filed: Jan. 2, 2020

(86) PCT No.: PCT/US2020/012065
§ 371 (c)(1),
(2) Date: Jul. 2, 2021

(87) PCT Pub. No.: WO2020/142616
PCT Pub. Date: Jul. 9, 2020

(65) Prior Publication Data
US 2022/0074839 A1    Mar. 10, 2022

Related U.S. Application Data (60) Provisional application No. 62/787,491, filed on Jan. 2, 2019.

(51) Int. Cl.
*G01N 11/14*    (2006.01)
*G01N 11/00*    (2006.01)

(52) U.S. Cl.
CPC ........ *G01N 11/14* (2013.01); *G01N 2011/002* (2013.01); *G01N 2011/0093* (2013.01)

(58) Field of Classification Search
None
See application file for complete search history.

(56) References Cited

U.S. PATENT DOCUMENTS 6,240,770 B1 *    6/2001    Raffer ............... B01L 7/00
                                                        73/54.23
6,571,609 B1      6/2003    Bi
(Continued)

FOREIGN PATENT DOCUMENTS

| CN | 106124362 A | 11/2016 |
| WO | 2008091120 A1 | 7/2008 |
| WO | 2018071512 A1 | 4/2018 |

OTHER PUBLICATIONS

Exam Report under Section 18(3) issued in United Kingdom Patent Application GB2109525.2 dated Jun. 2, 2023, 5 pages.
(Continued)

*Primary Examiner* — Patrick Assouad
*Assistant Examiner* — Mark A Shabman
(74) *Attorney, Agent, or Firm* — Jeffrey D. Frantz (57) ABSTRACT

Rheometer systems and related methods are provided. In accordance with an example, a rheometer system includes a rheometer and a platform supporting the rheometer and movable between a lowered position and a raised position. The rheometer system includes a fluid receptacle defining an opening. The rheometer system includes a receptacle housing having a housing side and adapted to receive the fluid receptacle. The opening of the fluid receptacle facing the rheometer when the fluid receptacle is received by the receptacle housing. The rheometer system includes a thermoelectric device coupled adjacent to the housing side. The rheometer system includes a controller in communication with the thermoelectric device and adapted to control a temperature of the thermoelectric device.

20 Claims, 8 Drawing Sheets

(56) References Cited

U.S. PATENT DOCUMENTS

| | | | | |
|---|---|---|---|---|
| 6,571,610 | B1* | 6/2003 | Raffer | G01N 11/14 73/54.23 |
| 6,588,254 | B1 | 7/2003 | Foster et al. | |
| 7,275,419 | B2* | 10/2007 | Raffer | G01N 11/142 73/54.01 |
| 8,739,609 | B2 | 6/2014 | Lukay et al. | |
| 2003/0233867 | A1* | 12/2003 | Hall | G01N 11/14 73/54.28 |
| 2008/0248534 | A1* | 10/2008 | Lim | G05D 23/32 435/286.1 |
| 2010/0071443 | A1* | 3/2010 | Wrench | G01N 11/14 73/54.28 |
| 2014/0311226 | A1* | 10/2014 | Murray | B01L 7/00 219/432 |
| 2014/0373557 | A1* | 12/2014 | Himmer | F25B 21/02 165/80.1 |
| 2015/0068273 | A1* | 3/2015 | Wolf | G01N 11/00 73/9 |
| 2015/0338332 | A1* | 11/2015 | Hoshino | G01N 11/02 702/30 |
| 2016/0341647 | A1* | 11/2016 | Krenn | G01D 3/08 |
| 2017/0208783 | A1* | 7/2017 | Jung | A01K 63/065 |
| 2019/0331577 | A1* | 10/2019 | Leyser | C12Q 1/56 |
| 2020/0047184 | A1* | 2/2020 | Beer | C12Q 1/6869 |

OTHER PUBLICATIONS

Exam Report issued in United Kingdom Patent Application GB2109525.2 dated Aug. 14, 2023, 5 pages.

Exam Report issued in Indonesia Patent Application No. P00202105600 dated Oct. 4, 2023, 5 pages with English translation.

Substantive Exam issued in Saudi Arabia Patent Application No. 521422427 dated May 29, 2023, 18 pages.

Office Action and Search Report issued in Russian Patent Application No. 2021119472 dated Apr. 4, 2022, 17 pages with English translation.

Exam Report issued in United Kingdom Patent Application GB2109525.2 dated Sep. 1, 2022, 6 pages.

Second Substantive Exam issued in Saudi Arabia Patent Application No. 521422427 dated Dec. 23, 2023, 21 pages.

* cited by examiner

RHEOMETER SYSTEMS AND RELATED METHODS

BACKGROUND

Drilling fluids may be used in hydrocarbon drilling processes to maintain the structural integrity of the borehole, cool a drill bit, and/or carry cuttings from the drill bit to the surface. Tests may be performed on drilling fluid to determine properties of the drilling fluid under certain conditions. Some of these tests allow the rheology of the drilling fluid to be determined.

BRIEF DESCRIPTION OF THE DRAWINGS

The present application is the U.S. national phase of International Patent Application No. PCT/US2020/012065, filed Jan. 2, 2020, and entitled "Rheometer Systems and Related Methods," which claims priority to U.S. Provisional Application 62/787,491 filed Jan. 2, 2019, the entirety of which is incorporated by reference. Drilling fluids may be used in hydrocarbon drilling processes to maintain the structural integrity of the borehole, cool a drill bit, and/or carry cuttings from the drill bit to the surface. Tests may be performed on drilling fluid to determine properties of the drilling fluid under certain conditions. Some of these tests allow the rheology of the drilling fluid to be determined.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The disclosed examples relate to self-contained rheometer systems. In contrast to some known devices, the rheometer systems disclosed do not rely on an external recirculating bath to control a temperature of a fluid being analyzed. As a result, the rheometer systems disclosed may be relatively light weight, may be portable, and may not take up a significant amount of space. For example, the rheometer systems disclosed may weigh approximately 75 pounds and may take up approximately four cubic feet (e.g. 2 feet (ft)×2 ft×1 ft). Put another way, the rheometer systems may be relatively lightweight and may have a relatively small footprint.

Moreover, in contrast to some known devices that rely heavily on human involvement, the disclosed rheometer systems may be automated. Because the rheometer systems of the present disclosure may be automated and/or because rheology tests performed using the rheometer systems may be relatively standardized (with less or no human involvement), an amount of error and/or deviation in the rheology test results may be relatively low.

The rheometer system may be adapted to determine one or more rheological properties of a fluid at sub-ambient temperatures and/or elevated temperatures using a relatively small sample size (e.g., 165 milliliters (mL)). However, other sample sizes may be used based on the design of the rheometer system. For example, an approximately 100 mL sample may be used, an approximately 50 mL sample may be used, etc. The sample may be contained within a fluid receptacle while one or more rheology tests are performed. As a result of using such a small sample size, multiple tests may be performed using the fluid obtained from a standard high-pressure-high-temperature aging cell.

The rheometer systems may include a rheometer head that is movable between a lowered position and a raised position. In the lowered position, rheology tests can take place and/or the rheometer system can be relatively easily transported. In the raised position, the fluid receptacle and/or other components of the rheometer system may be cleaned. Spacing the rheometer head from the fluid receptacle may make cleaning and/or access to the fluid receptacle relatively easy.

In the raised position of the rheometer head, a sample can be added to the fluid receptacle. Moreover, in the raised position, the fluid receptacle may be relatively easily removed without the rheometer head interfering with the removal (e.g., being in the way). For example, the fluid receptacle may be removed with little if any tilting and/or manipulation of the fluid receptacle.

Figure 1:
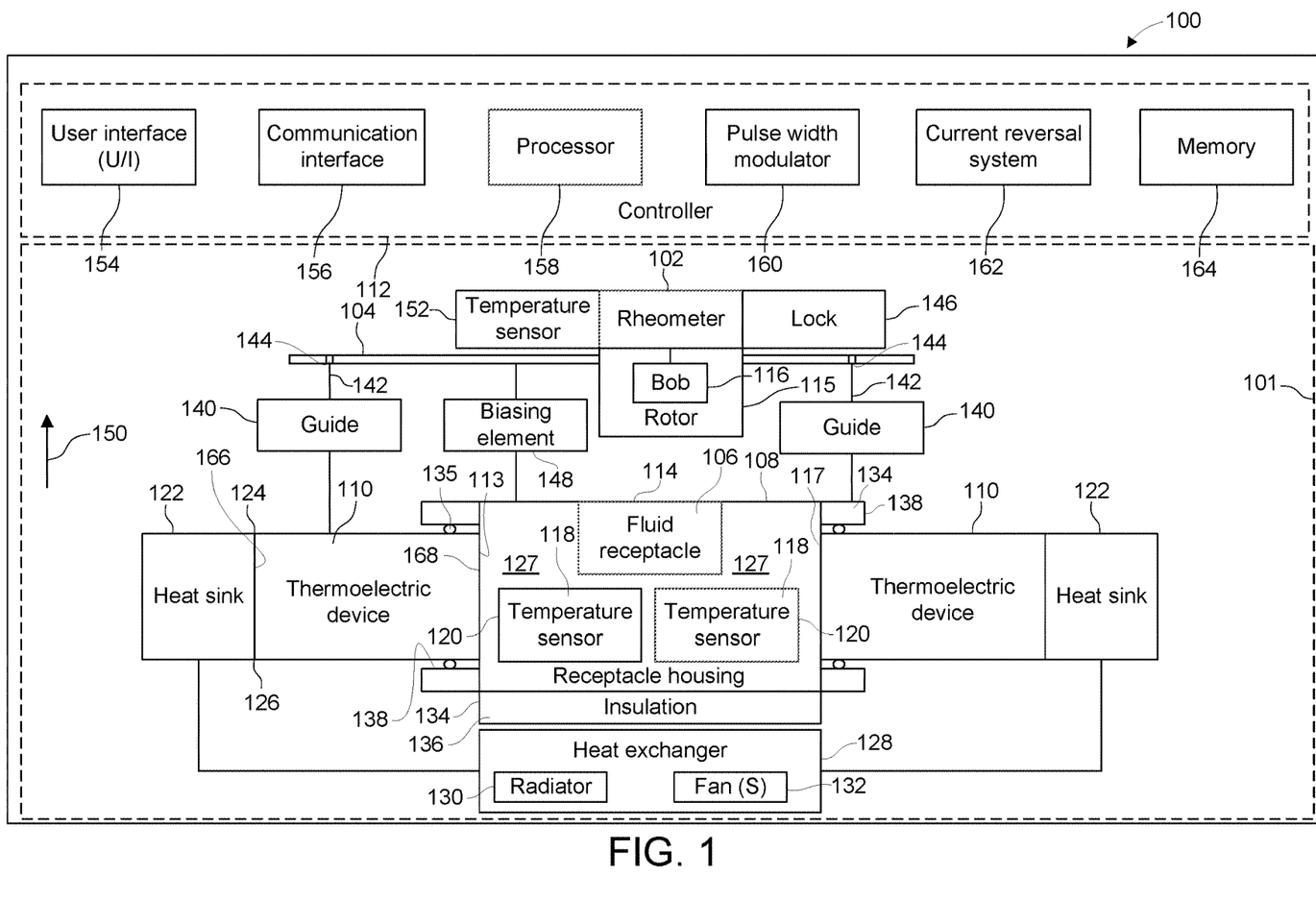
FIG. 1 is a schematic representation of a rheometer system in accordance with a first example of the present disclosure.

FIG. 1 is a schematic representation of a rheometer system 100 in accordance with a first example of the present disclosure. The rheometer system 100 can be used to perform an analysis on one or more fluid samples of interest. The fluid sample may include drilling fluid, drill-in fluids, completion fluids, spacers, washes, brines, packer fluids, fracturing fluids, cements, etc. The analysis may include determining the viscosity of the drilling fluid and/or a gel strength of the drilling fluid. Other parameters of the fluid may be determined.

In the example shown, the rheometer system 100 includes, in part, a rheometer unit 101 including a rheometer 102, a platform 104, a fluid receptacle 106, a receptacle housing 108, and a thermoelectric device 110. The fluid receptacle 106 may be a cup that receives the fluid on which an analysis is being performed. The fluid receptacle 106 may be referred to as a heating cup. The receptacle housing 108 may be an aluminum block. However, the receptacle housing 108 may be a different material. For example, the receptacle housing 108 may include another metal or other materials. For example, the receptacle housing 108 may include steel, Aluminum nitride, and/or silicon carbide. The thermoelectric device 110 may be a Peltier device.

The rheometer system 100 also includes a controller 112. The controller 112 may be electrically and/or communicatively coupled to the rheometer 102 and/or the thermoelectric device 110. The controller 112 is adapted to cause the rheometer 102 and/or the thermoelectric device 110 to perform various functions as disclosed herein.

In the example shown, the platform 104 supports the rheometer 102 and is movable between a lowered position and a raised position. The platform 104 is shown in the raised position in FIG. 1. The receptacle housing 108 has a housing side 113. The receptacle housing 108 is adapted to receive or otherwise house the fluid receptacle 106.

The fluid receptacle 106 has an opening 114. The opening 114 of the fluid receptacle 106 faces the rheometer 102 when the fluid receptacle 106 is received by the receptacle housing 108.

The rheometer 102 includes a rotor 115 and a bob 116. The rotor 115 and the bob 116 are arranged to be positioned through the opening 114 of the fluid receptacle 106 and disposed within the fluid receptacle 106 when the platform 104 is in the lowered position.

The rotor 115 may be adapted to rotate about the bob 116. Depending on properties of the fluid within the fluid receptacle 106, rotating the rotor 115 may also rotate the bob 116, allowing for the controller 112 to determine conditions that are present that are consistent with a property (e.g., an intrinsic property) of the fluid. The property of the fluid may be associated with a shear stress value and/or a viscosity value of the fluid. Other properties of the fluid may additionally or alternatively be determined.

The thermoelectric device 110 is coupled adjacent to the housing side 113. As set forth herein, the thermoelectric device 110 being coupled adjacent to the housing side 113 means that the thermoelectric device 110 is positioned relative to the housing side 113 such that a temperature of the thermoelectric device 110 affects a temperature of the receptacle housing 108. For example, the thermoelectric device 110 may directly contact the housing side 113. Alternatively, the thermoelectric device 110 may be spaced from the housing side 113. If the thermoelectric device 110 is spaced from the housing side 113, a heat transfer material (e.g., a heat transfer paste) may be positioned between the thermoelectric device 110 and the receptacle housing 108.

The controller 112 is in communication with the thermoelectric device 110 and is adapted to control a temperature of the thermoelectric device 110. For example, the controller 112 can be adapted to change (e.g., vary) the current to the thermoelectric device 110, which in turn changes the temperature of the thermoelectric device 110.

The rheometer system 100 may include more than one thermoelectric device 110 as shown in the example of FIG. 1. In such examples, another thermoelectric device 110 may be coupled adjacent another side 117 of the receptacle housing 108. The housing sides 113, 117 may oppose one another. However, one or more of the thermoelectric devices 110 may be positioned on any side and/or surface of the receptacle housing 108. Including a pair of thermoelectric devices 110 instead of a single thermoelectric device 110 may reduce a temperature gradient of the fluid within the fluid receptacle 106 and/or may increase the granularity (e.g., precision) with which the temperature of the rheometer system 100 can be controlled.

A housing temperature sensor 118 is disposed within the receptacle housing 108. The housing temperature sensor 118 may be encased within the receptacle housing 108. The housing temperature sensor 118 may be positioned beneath the thermoelectric device 110 or otherwise adjacent the housing side 113. Positioning the housing temperature sensor 118 within the receptacle housing 108 and/or beneath the thermoelectric device 110 may allow for a relatively precise temperature measurement to be obtained. As set forth herein, positioning the housing temperature sensor 118 adjacent the housing side 113 means that the housing temperature sensor 118 is positioned to determine a temperature within the receptacle housing 108 and/or to determine a temperature of the thermoelectric device 110.

The temperature measurement(s) obtained by the housing temperature sensor 118 may be used by the controller 112 to determine a temperature within the receptacle housing 108 and/or to determine if the thermoelectric device 110 is operating as expected. For example, using the temperature value(s) obtained by the housing temperature sensor(s) 118, the controller 112 can determine if the temperature within the receptacle housing 108 and/or the fluid contained within the fluid receptacle 106 is within a threshold of a reference temperature for a rheology test being performed.

While the housing temperature sensor 118 is disclosed being below the thermoelectric device 110, the housing temperature sensor 118 may be positioned in a different location. For example, the housing temperature sensor 118 may be positioned adjacent the housing side 113 or otherwise arranged to determine a temperature within the receptacle housing 108, of the thermoelectric device 110, and/or another temperature of interest.

When the rheometer system 100 includes more than one thermoelectric device 110, a corresponding number of housing temperature sensors 118 may be included. In such examples, each housing temperature sensor 118 may be disposed within the receptacle housing 108 adjacent a corresponding housing side 113, 117.

The receptacle housing 108 may include a sensor receptacle 120. The housing temperature sensor 118 is shown being disposed within the sensor receptacle 120.

In operation, the housing temperature sensor 118 is adapted to determine a temperature value within the receptacle housing 108 during a rheology test. The controller 112 may compare the determined temperature value to a reference temperature value. The reference temperature value may be associated with the rheology test being performed. When the determined temperature value is outside of a threshold of the reference temperature value, the controller 112 may cause the thermoelectric device 110 to change the temperature within the receptacle housing 108 (e.g., by applying more, or less, heat energy to the receptacle housing 108) to allow a subsequently determined temperature value to be within the threshold of the reference temperature value. The threshold may be a range of acceptable temperature values. Additionally or alternatively, the controller 112 may be adapted to change the temperature within the receptacle housing 108 using the thermoelectric device 110 during a second rheology test. Any number of rheology tests (e.g., 1, 2, 3, 4, 5, 11) may be performed.

During the rheology test, approximately 165 milliliters (mL) of fluid (e.g., drilling fluid) may be contained within the fluid receptacle 106. The amount of fluid used during the rheology tests performed using the disclosed examples may be approximately half of the fluid used during rheology tests performed using some known (conventional) devices. As a result, the remaining fluid (e.g., 350 mL minus 165 mL) may be used for another test. The other test may include high-pressure-high-temperature (HTHP) filtration and/or a chemical test.

In the example shown, a heat sink 122 is coupled adjacent to the thermoelectric device 110. As set forth herein, the heat sink 122 being coupled adjacent to the thermoelectric device 110 means that the heat sink 122 is positioned relative to the thermoelectric device 110 such that heat sink 122 is thermally coupled to the thermoelectric device 110. For example, the heat sink 122 may directly contact the thermoelectric device 110. Alternatively, the heat sink 122 may be spaced from the thermoelectric device 110.

An interface 124 between the thermoelectric device 110 and the heat sink 122 may be at an elevated temperature or a decreased temperature depending on an operational state of the thermoelectric device 110. For example, when the thermoelectric device 110 is heating the fluid receptacle 106, the interface 124 may be at a decreased temperature and when the thermoelectric device 110 is cooling the fluid receptacle 106, the interface 124 may be at an increased temperature. When the thermoelectric device 110 is cooling the fluid receptacle 106, the heat sink 122 may be adapted to reduce the temperature at the interface 124 and/or draw heat from the thermoelectric device 110.

A thermoelectric paste 126 may be included at the interface 124 to increase heat transfer between the thermoelectric device 110 and the heat sink 122. Additional or alternative heat-transfer materials may be included to increase energy transfer between the receptacle housing 108 and the thermoelectric device 110 and/or between the receptacle housing 108 and the fluid receptacle 106. For example, a fluid (e.g., a heat transfer fluid) may be included in a space 127 between the fluid receptacle 106 and the sides 113, 117 of the receptacle housing 108. Some heat-transfer materials include metal foil or a liquid metal (e.g., a liquid metal interface).

The heat sink 122 may be part of or otherwise associated with a heat exchanger 128 including the heat sink 122, a radiator 130, and a fan 132. The heat sink 122 may be fluidically coupled to the radiator 130 to allow coolant to flow from the radiator to the heat sink 122. The heat sink 122 and/or the radiator 130 may be alternately arranged.

More than one fan 132 may be included. The radiator 130 may be a liquid-to-air radiator or an air-to-air radiator. Regardless of the type of radiator 130 included, the rheometer system 100 may be considered a "self-contained" system without including an external circulating chiller as is used with some known devices.

Figure 4:
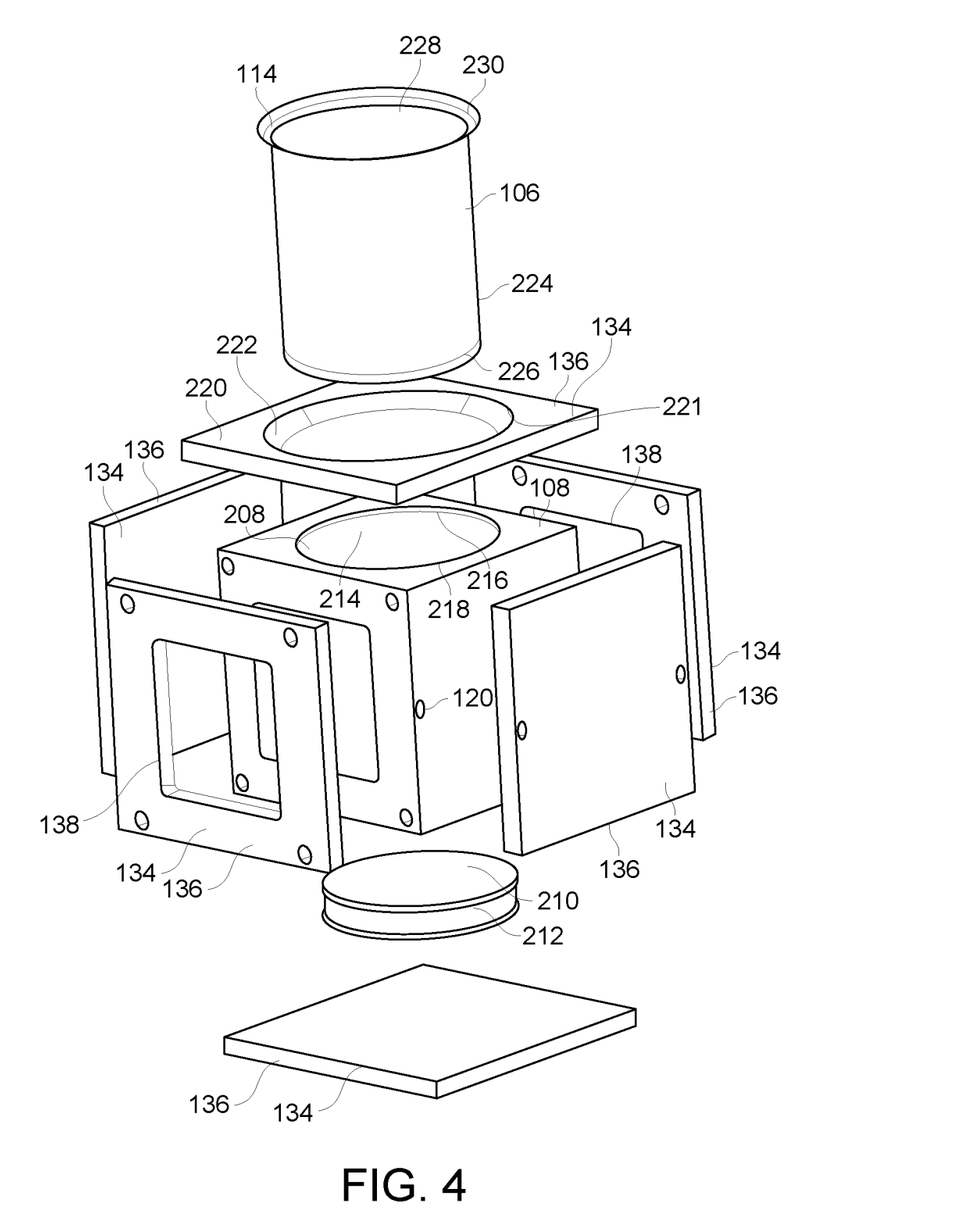
FIG. 4 is an isometric exploded view of an implementation of the receptacle housing, the insulation sheets, and the fluid receptacle of the rheometer system of FIG. 1.

As illustrated in FIG. 1, insulation 134 is included that covers the receptacle housing 108 (see, also, FIG. 4). The insulation 134 may include a plurality of insulation sheets 136. Each insulation sheet 136 may cover and/or be coupled adjacent a corresponding side of the receptacle housing 108. The insulation 134 defines a hole 138. The hole 138 is positioned in the insulation 134 adjacent the housing side 113, 117 where the thermoelectric devices 110 are coupled (see FIG. 1). The thermoelectric device 110 is positioned adjacent the hole 138. Having the thermoelectric device 110 positioned adjacent the hole 138 means that the thermoelectric device 110 extends into (or through) the dimensional envelope of the hole 138 or is otherwise positioned to allow heat transfer between the thermoelectric device 110 and the receptacle housing 108. In the example shown, the thermoelectric device 110 is in direct contact with the sides 113, 117 of the receptacle housing 108.

A seal 135 may be positioned between the thermoelectric device 110 and the insulation 134. The seal 135 may be foam rubber. Other types of materials may be used to form the seal 135. For example, the seal 135 may be formed of rubber (e.g., solid rubber), polyurethane, and/or Polytetrafluoroethylene (PTFE).

Figure 2:
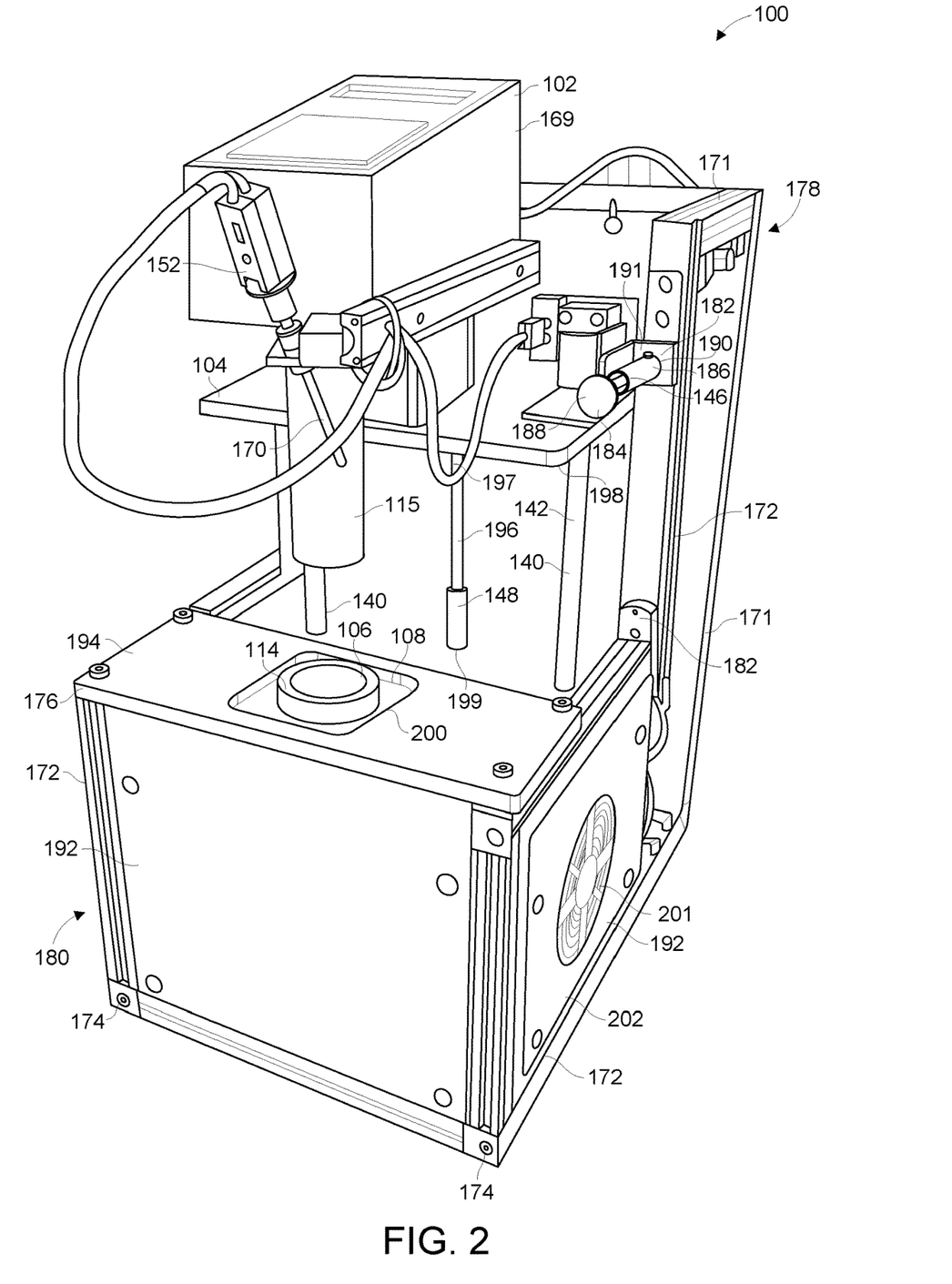
FIG. 2 is an isometric view of an implementation of the rheometer system of FIG.
Figure 3:
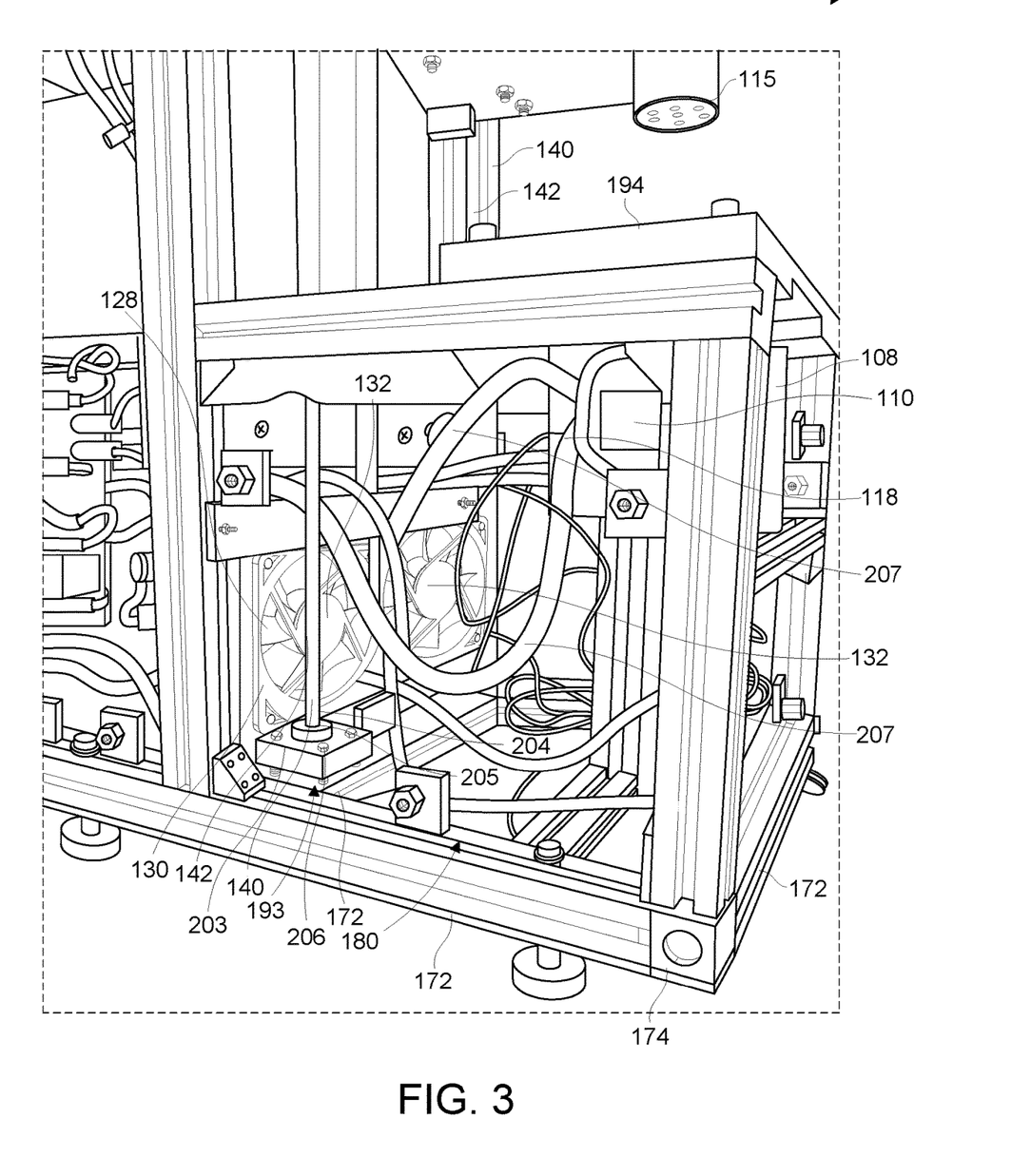
FIG. 3 is a detailed isometric view of a front frame portion of the rheometer system of FIG. 2 with panels removed.

In the example illustrated in FIG. 1, a guide 140 is included (see, also, FIGS. 2 and 3). The guide 140 is adapted to guide movement of the platform 104 between the lowered position and the raised position. The guide 140 may include a rod 142 that extends through a corresponding through hole 144 of the platform 104. The guide 140 may include a linear bearing set that allows for vertical movement of the platform 104.

A pair of rods 142 and a pair of corresponding through holes 144 may be included. As an alternative, the guide 140 may include a rail and a block. The block may be coupled to the platform 104 and may be movably coupled to the rail. For example, the block may include a dovetail groove and the rail may have a corresponding cross-section that is receivable in the dovetail groove of the block. The block may include bearings. The guide 140 may alternatively include one or more linear actuators. The linear actuators may be adapted to raise and/or lower the platform 104.

In the example shown, a lock 146 is included. The lock 146 may be movable between a release position and a secure position. The lock 146 is adapted to selectively secure the platform 104 in the lowered position or in the raised position. For example, the lock 146 may prevent the platform 104 from moving in a direction generally indicated by arrow 150 when the platform 104 is in the lowered position and a rheology test is being performed. In the release position of the lock 146, the platform 104 may be moved between the lowered position and the raised position.

The lock 146 is illustrated being coupled to the platform 104. However, the lock 146 may alternatively be coupled to the rheometer system 100 in a different manner. The lock 146 may be a spring-biased pin that is received within a corresponding blind hole of the rheometer system 100 (see, for example, FIG. 2).

In the example illustrated schematically in FIG. 1, a biasing element 148 is included. The biasing element 148 may be referred to as a spring-assisted lift. The biasing element 148 is disposed between the receptacle housing 108 and the platform 104. The biasing element 148 is adapted to bias the platform 104. For example, the biasing element 148 may substantially retain the relative position of the platform 104 when the lock 146 is moved from the secure position to the release position. If the biasing element 148 were not included, the weight of the platform 104 and the components supported thereby may have a tendency to move the platform 104 in a direction generally opposite to the direction indicated by the arrow 150.

A fluid receptacle temperature sensor 152 is also included. The fluid receptacle temperature sensor 152 may be a dual-element thermocouple. In the example shown, the fluid receptacle temperature sensor 152 is coupled to the platform 104 and is arranged to be disposed within the fluid receptacle 106 when the platform 104 is in the lowered position and the fluid receptacle 106 is received by the receptacle housing 108. The fluid receptacle temperature sensor 152 may be adapted to measure a temperature of the fluid within the fluid receptacle 106 when, for example, a rheology test is being performed. However, the fluid receptacle temperature sensor 152 may be differently arranged. For example, the fluid receptacle temperature sensor 152 may be secured relative to the receptacle housing 108 and, thus, not coupled to the platform 104.

In operation, the fluid receptacle temperature sensor 152 is adapted to determine the temperature value of fluid contained within the fluid receptacle 106. The controller 112 is adapted to determine when the fluid within the fluid receptacle 106 has reached a threshold temperature value. The threshold temperature value may be referred to as a set point temperature value.

The controller 112 may determine that the threshold temperature value has been reached by comparing the determined temperature value to a reference temperature value. When the fluid within the fluid receptacle 106 has reached the threshold temperature value, the controller 112 may cause the rheometer 102 to perform one or more rheology tests. Additionally, when the fluid within the fluid receptacle 106 has reached the threshold temperature value, the controller 112 may cause the thermoelectric device 110 to maintain the temperature within a threshold range of the threshold temperature value. The thermoelectric device 110 may maintain the temperature for a hold-time associated with the completion of the rheology test being performed. If the determined temperature is outside of the threshold range, the controller 112 may change the temperature of the thermoelectric device 110, generate an alert, and/or determine an amount of time that the temperature is outside of the range. After the hold time has lapsed, a subsequent rheology test may be performed in the schedule.

While the example of FIG. 1 schematically illustrates the rheometer system 100 including a single rheometer unit 101, in other examples, more than one rheometer unit 101 may be included. In such examples, a plurality of rheometer units 101 may be controlled by a single controller 112. Alternatively, each rheometer unit 101 may be controlled by a corresponding controller 112.

In the example shown, the controller 112 includes a user interface 154, a communication interface 156, one or more processors 158, a pulse width modulator 160, a current reversal system 162, and a memory 164 storing instructions executable by the one or more processors 158 to perform various functions including the disclosed examples. The user interface 154, the communication interface 156, the pulse width modulator 160, the current reversal system 162, and the memory 164 are electrically and/or communicatively coupled to the one or more processors 158.

In an example, the user interface 154 is adapted to receive input from a user and to provide information to the user associated with the operation of the rheometer system 100 and/or an analysis taking place. For example, the user interface 154 may display the alert associated with the determined temperature deviating from the reference temperature and/or the determined temperature deviating from the reference temperature for an amount of time. The user interface 154 may include a touch screen, a stylus, a display, a key board, a speaker(s), a mouse, a track ball, and/or a voice recognition system. The touch screen and/or the display may display a graphical user interface (GUI).

In an example, the communication interface 156 is adapted to enable communication between the rheometer system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, temperature data, etc. generated or otherwise obtained by the rheometer system 100. Some of the communications provided to the rheometer system 100 may be associated with the fluid on which the analysis is being performed.

The one or more processors 158 and/or the rheometer system 100 may include one or more of a processor-based system(s) or a microprocessor-based system(s). In some examples, the one or more processors 158 and/or the rheometer system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit and/or another logic-based device executing various functions including the ones described herein.

The pulse width modulator 160 may be used to control the temperature of the thermoelectric device 110. For example, the pulse width modulator 160 may be used to switch an electric circuit on and off at a frequency rate that produces an average current flow. Flowing current through the thermoelectric device 110 for longer periods of time compared to the periods of time where current does not flow to the thermoelectric device 110 increases an amount of power provided to the thermoelectric device 110. The amount of power provided to the thermoelectric device 110 is associated with a higher temperature being produced on one side 166 of the thermoelectric device 110 and a lower temperature being produced on another side 168 of the thermoelectric device 110. Depending on the direction of the flow of the current, the side 166 of the thermoelectric device 110 may be at a lower temperature than the other side 168 of the thermoelectric device 110.

The difference in temperatures between the sides 166, 168 of the thermoelectric device 110 may be decreased by increasing an amount of time when electric current is not supplied to the thermoelectric device 110, via the pulse width modulator 160. The pulse width modulator 160 may cause the thermoelectric device(s) 110 to adjustably heat or cool the fluid receptacle 106 to a threshold temperature value. The threshold temperature value may be associated with a rheology test and/or another test being performed by the rheometer system 100.

The current reversal system 162 may be adapted to cause the processor 158 to direct electric current through the thermoelectric device 110 in a direction to allow a threshold temperature within the fluid receptacle 106 to be achieved. When the electric current passes through the thermoelectric device 110 in a first direction, the temperature of the side 166 of the thermoelectric device 110 may be higher than the temperature on the other side 168 of the thermoelectric device 110. When the electric current passes through the thermoelectric device 110 in a second direction opposite the first direction, the temperature of the side 166 of the thermoelectric device 110 may be lower than the temperature on the other side 168 of the thermoelectric device 110. The pulse width modulator 160 and/or the current reversal system 162 may provide variable heating and cooling rates for the receptacle housing 108, the fluid receptacle 106, and/or fluid contained within the fluid receptacle 106.

Figure 6:
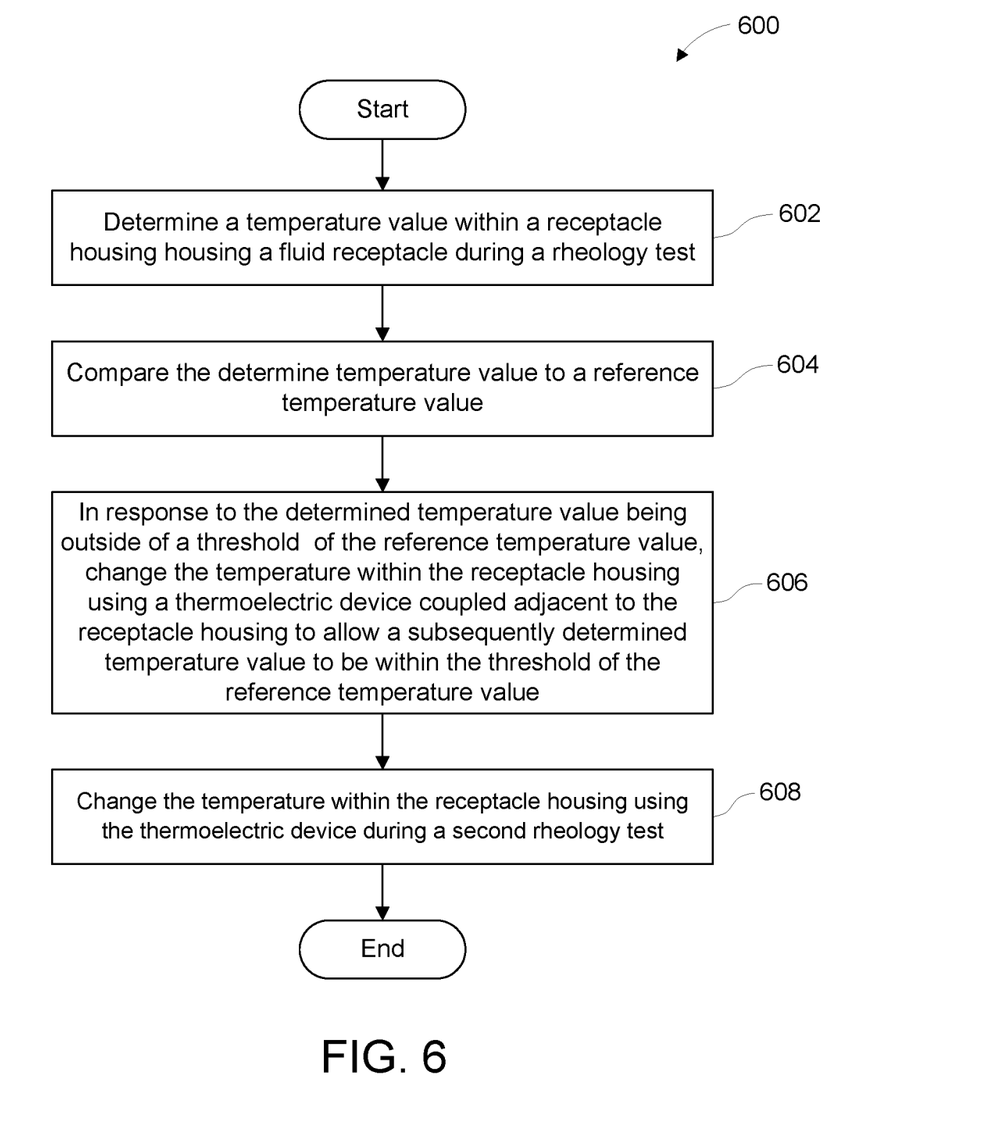
FIG. 6 is a flowchart depicting a method for operating the rheometer system of FIG.
Figure 7:
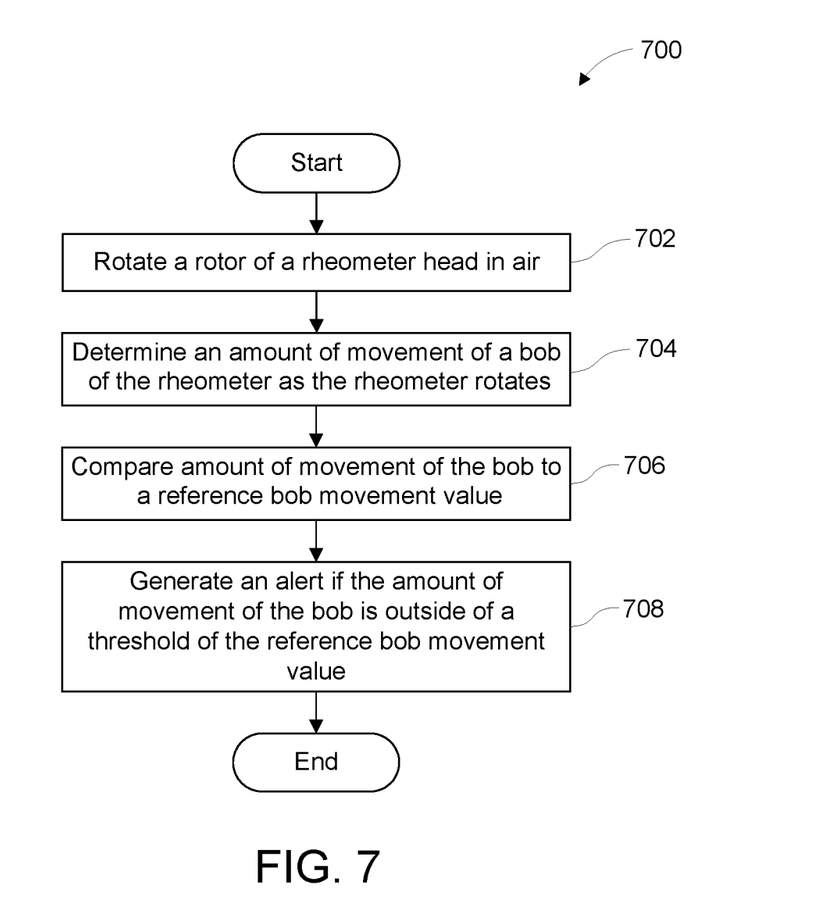
FIG. 7 is a flowchart depicting a method for performing a process using the rheometer system of FIG. 1 to determine if the rheometer system is operating as expected.

The memory 164 may be a non-transitory computer readable medium storing instructions for carrying out a method such as those disclosed in connection with FIGS. 6 and 7 or carrying out any of the other examples disclosed herein. The memory 164 may store the reference temperatures and/or temperatures associated with different rheology tests. The memory 164 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

FIG. 2 is an isometric view of an implementation of the rheometer system 100 of FIG. 1. The platform 104 and the rheometer 102 are shown in the raised position. The rheometer 102 includes a rheometer head 169 and the rotor 115. The fluid receptacle temperature sensor 152 is coupled adjacent to the rheometer head 169 and includes a distal end 170 that is arranged to be disposed within the fluid receptacle 106 when the platform 104 is in the lowered position.

In the example shown, the rheometer system 100 includes a frame 171. The frame 171 includes a plurality of beams 172. The beams 172 may be coupled via fasteners 174. Corners 176 are formed where at least some of the beams 172 overlap.

The frame 171 includes a back frame portion 178 and a front frame portion 180. A beam 172 of the back frame portion 178 may include a lock portion 182. The lock portion 182 may include a blind bore or a bore. A pair of lock portions 182 are included in the example shown, with one of the lock portions 182 being positioned at the raised position of the platform 104 and another one of the lock portions 182 being positioned at the lowered position of the platform 104.

In the example shown, the lock 146 includes a spring-biased plunger 184. The spring-biased plunger 184 is movable within a cylinder 186 and includes a handle 188 and an end 190. The end 190 is receivable within the lock portion 182 to secure the position of the platform 104. A bracket 191 is coupled between the platform 104 and the spring-biased plunger 184. The bracket 191 is an L-bracket and the cylinder 186 is coupled to a leg of the bracket 191.

Panels 192 are coupled to the beams 172 of the front frame portion 180. The panels 192 and the beams 172 of the front frame portion 180 define an enclosure 193 (see, for example, FIGS. 2 and 3). Various components of the rheometer system 100 may be disposed within the enclosure 193. For example, the receptacle housing 108, a portion of the fluid receptacle 106, the thermoelectric device 110, and the heat sink 122 may be disposed within the enclosure 193, some of which can be seen in one or both of FIGS. 2 and 3.

In the example shown, the biasing element 148 and the guides 140 are disposed between an upward facing panel 194 of the front frame portion 180 and the platform 104. The guides 140 may be the pair of rods 142 and the biasing element 148 may be disposed between the rods 142. The biasing element 148 may be a gas strut 196. The gas strut 196 includes an end 197 coupled to a downward facing surface 198 of the platform 104 and another end 199 coupled adjacent and/or to the upward facing panel 194. Other types of biasing elements may alternatively be used. For example, a spring, shock absorber, or another type of strut may be used to bias the platform 104.

The upward facing panel 194 defines a through hole 200. The through hole 200 may allow access to the fluid receptacle 106 and its opening 114 and the receptacle housing 108. The through hole 200 is shown being rectangular (e.g., square). However, the through hole 200 may be of a different shape. For example, the through hole 200 may be circular.

In the example shown, fan holes 201 are defined in at least one side panel 202 of the front frame portion 180. The fan holes 201 may be used to circulate air into the enclosure 193.

FIG. 3 is a detailed isometric view of the front frame portion 180 of the rheometer system 100 of FIG. 2 with the panels 192 removed. In the example shown, the receptacle housing 108, the thermoelectric device 110, and the heat exchanger 128 are disposed within the dimensional envelope of the rheometer system 100.

Mounting feet 203 may be included to secure the relative position of the rods 142. The mounting feet 203 are coupled to one of the beams 172. The mounting feet 203 are shown receiving a distal end 204 of the rod 142 of the guide 140. The mounting feet 203 may include a blind hole 205. The blind hole 205 may be adapted to receive the distal end 204 of the rod 142. Fasteners 206 may be used to couple each mounting foot 203 to the beam 172.

In the example shown, the radiator 130 is a liquid-to-air radiator with forced air convection via the fans 132. Hoses 207 are fluidically coupled between, for example, the radiator 130 and the corresponding heat sink 122. The hoses 207 may be used to flow coolant to the heat sink 122.

The radiator 130 may be associated with a common coolant reservoir. The common coolant reservoir may be housed by the rheometer system 100. The common coolant reservoir may provide coolant to the heat sinks 122 of the rheometer system 100. Including the common coolant reservoir may allow the coolant to be monitored. For example, a coolant level and/or a condition of the coolant may be monitored. The coolant may be referred to as a cooling fluid. In other examples, each thermoelectric device 110 has an associated corresponding coolant reservoir. Alternatively, the coolant reservoir may be omitted entirely. In other examples, the hoses 207 may be omitted. For example, the hoses 207 may be excluded when the radiator 130 is implemented by an air-to-air radiator.

FIG. 4 illustrates an isometric expanded view of the receptacle housing 108, the insulation sheets 136, and the fluid receptacle 106 of the rheometer system 100 of FIG. 1. In the example shown, the receptacle housing 108 defines a through bore 208. A cap 210 (which also may be referred to as a plug) is included and is sized to be received within one end of the through bore 208. The cap 210 is circular.

The cap 210 defines a groove 212. A seal (not shown) may be received within the groove 212. The seal may be an O-ring. The seal may sealingly engage an inner surface 214 of the through bore 208 when the cap 210 around which the seal is positioned is disposed within the through bore 208. As an alternative, the through bore 208 may be formed as a blind bore and the cap 210 may not be included.

Another end 216 of the through bore 208 includes a through bore opening 218. A top insulation layer 220 includes an insulation opening 221. The through bore opening 218 is aligned with the insulation opening 221 and is adapted to receive the fluid receptacle 106. The top insulation layer 220 includes a chamfer 222 that at least partially defines the insulation opening 221.

The fluid receptacle 106 includes a cylindrical body 224, a closed bottom 226, and an open top 228. The open top 228 is at least partially defined by an outwardly tapered lip 230. The outwardly tapered lip 230 may engage with the chamfer 222 of the top insulation layer 220 when the fluid receptacle 106 is positioned through the insulation opening 221 and disposed within the through bore 208 of the receptacle housing 108.

Figure 5A:
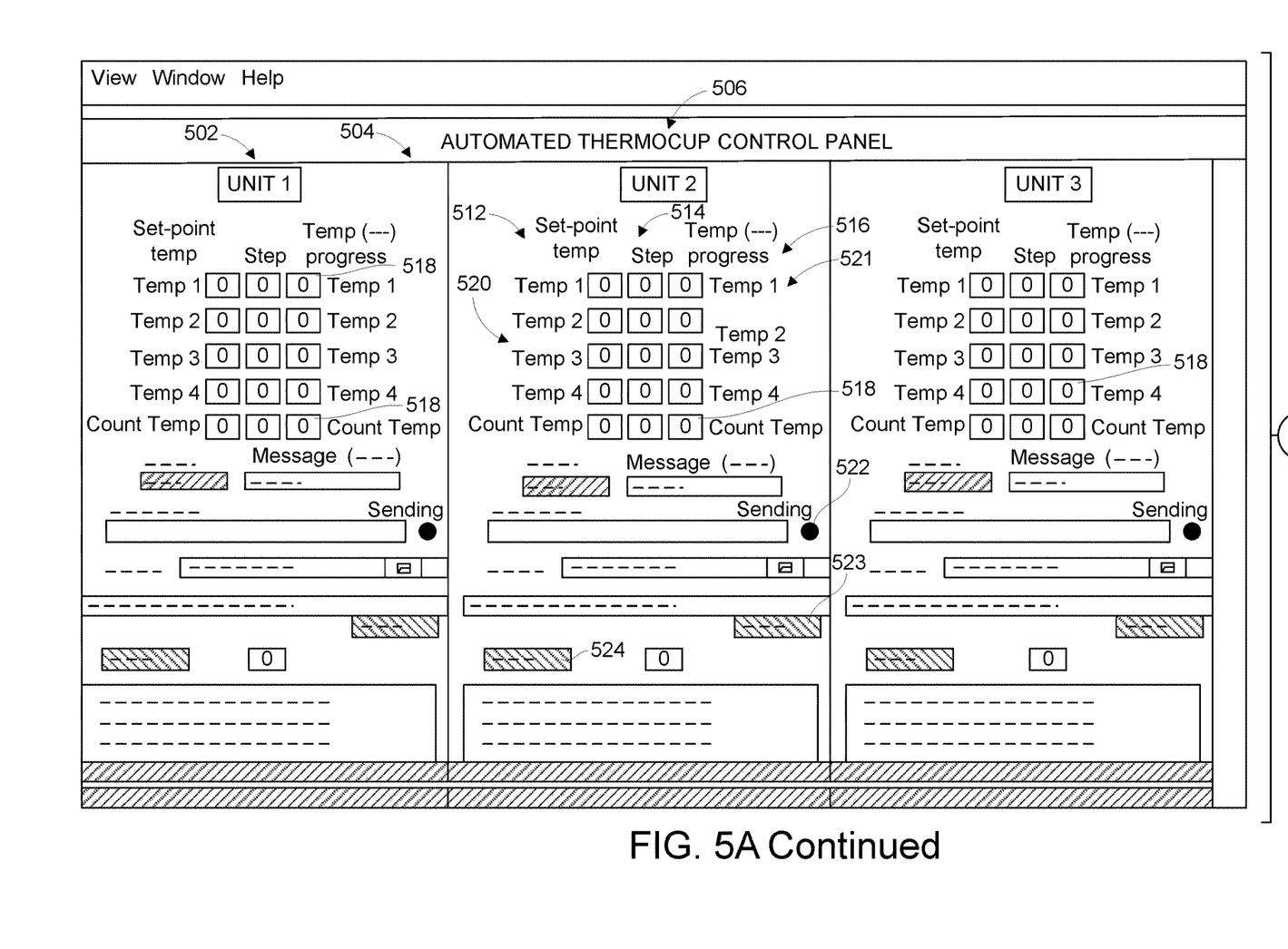
FIGS. 5A and 5B illustrate an implementation of a graphical user interface (GUI) that may be displayed on the user interface of the rheometer system of FIG. 1.
Figure 5B:
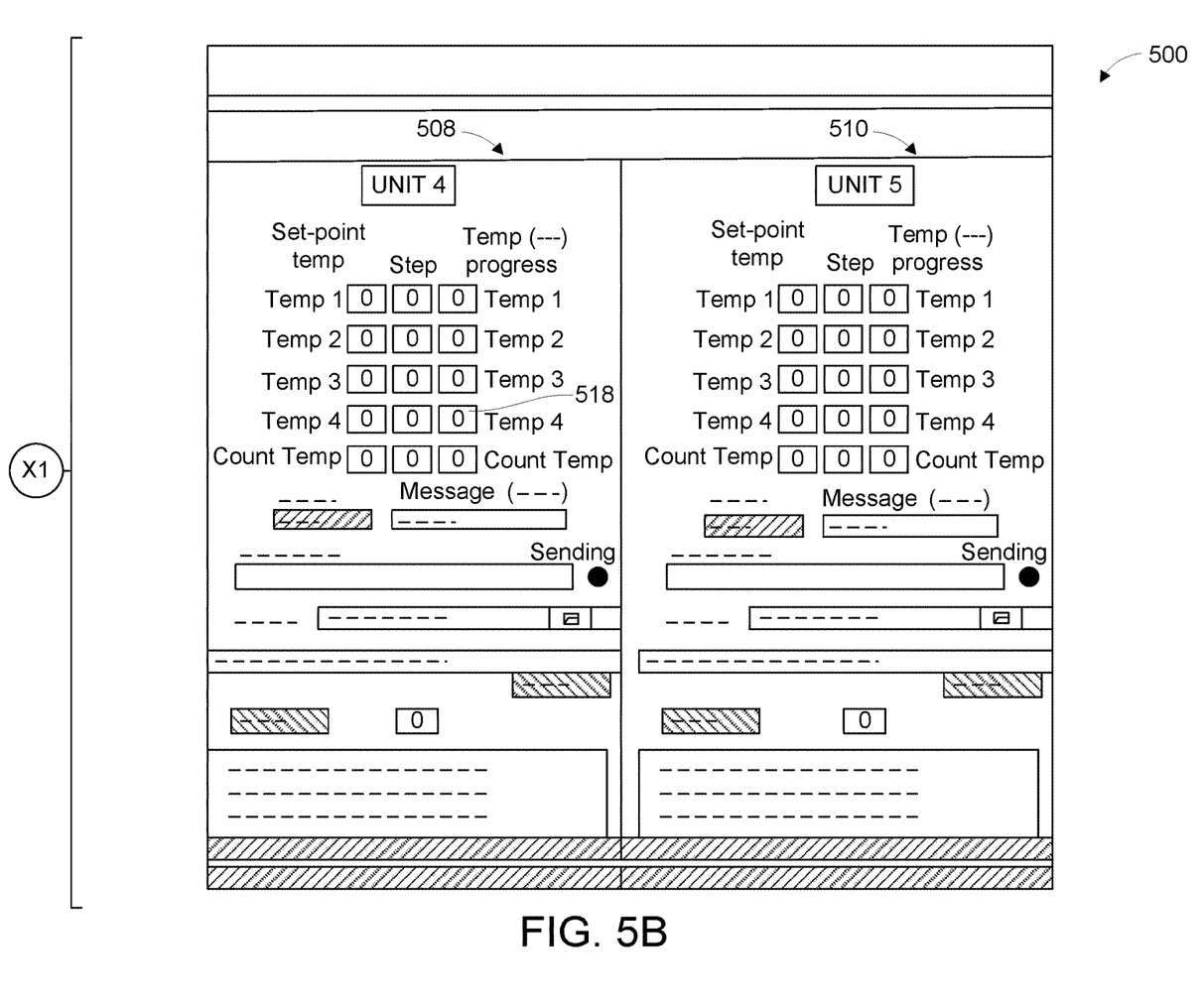

FIGS. 5A and 5B illustrate an implementation of a graphical user interface (GUI) 500 that may be displayed on the user interface 154 of rheometer system 100 of FIG. 1. The GUI 500 may be used to provide input to the rheometer unit 101 of FIG. 1. The GUI 500 may be used to receive output from the rheometer unit 101 of FIG. 1.

In the example shown, the GUI 500 includes a first portion 502 associated with a first rheometer unit 101, a second portion 504 associated with a second rheometer unit 101, a third portion 506 associated with a third rheometer unit 101, a fourth portion 508 associated with a fourth rheometer unit 101, and a fifth portion 510 associated with a fifth rheometer unit 101. While five portions 502, 504, 506, 508, 510 and five associated rheometer units 101 are included, any other number of portions and/or rheometer units 101 may be included instead (e.g., 2, 3, 4, 6, 7).

In the example shown, each portion 502, 504, 506, 508, 510 includes a first column 512, a second column 514, and a third column 516. A plurality of data entry fields 518 are positioned under each of the columns 512, 514, 516.

The first column 512 is associated with a set point temperature. The set point temperature may be in Fahrenheit. Rows 520 beneath the first column 512 may be associated with a first temperature, a second temperature, a third temperature, a fourth temperature, and a cool temperature.

The second column 514 is associated with a hold-time schedule and/or a step. The third column 516 is associated with progress. The progress may be associated with an amount of time (in minutes) that has lapsed in, for example, a rheology test. Rows 521 beneath the second and/or third column 514, 516 may be associated with a first time, a second time, a third time, a fourth time, and a cool time.

The GUI 500 includes a "save" icon 522. The save icon 522 may be selected to cause the controller 112 to generate a data file. The data file may be stored in the memory 164. The GUI 500 also includes a schedule icon 523 and a sensor icon 524. The schedule icon 523 may be selected to cause the controller 112 to display, for example, the rheology testing schedule on the GUI 500. The sensor icon 524 may be selected to cause the controller to display, for example, details of the housing temperature sensor 118 on the GUI 500.

In operation, an operator may enter parameter values into the data entry fields 518 and one or more rheology tests may begin based on the parameter values received or otherwise accessed.

FIGS. 6 and 7 are flowcharts for methods of operating the rheometer system 100 of FIG. 1 or any of the other implementations disclosed herein. The order of execution of the blocks may be changed, and/or some of the blocks described may be changed, eliminated, combined and/or subdivided into multiple blocks.

A method 600 of FIG. 6 begins by determining a temperature value within the receptacle housing 108 housing the fluid receptacle 106 during a rheology test (block 602). The housing temperature sensor 118 may be used to determine the temperature value. The fluid receptacle 106 may contain fluid such as, for example, a drilling fluid. The determined temperature value is compared to a reference temperature value (block 604). The reference temperature value may be stored in the memory 164. The controller 112 may compare the determined temperature value to the reference temperature value.

In response to the determined temperature value being outside of a threshold of the reference temperature value, the temperature within the receptacle housing 108 is changed using the thermoelectric device 110 coupled adjacent to the receptacle housing 108 to allow a subsequently determined temperature value to be within the threshold of the reference temperature value (block 606). The threshold may be a range of the temperature values. In some examples, changing the temperature within the receptacle housing 108 includes changing the temperature within the receptacle housing 108 using a pair of thermoelectric devices 110 coupled adjacent opposing sides 113, 117 of the receptacle housing 108. The temperature within the receptacle housing 108 may be changed using the thermoelectric device 110 during a second rheology test (block 608).

A method 700 of FIG. 7 begins by rotating the rotor 115 of the rheometer 102 in air (block 702). An amount of movement of the bob 116 of the rheometer 102 is determined as the rotor 115 rotates (block 704). The bob 116 may be disposed within a dimensional envelope of the rotor 115. The determined amount of movement of the bob 116 is compared to a reference bob movement value (block 706). The reference bob movement value may be stored in the memory 164. The controller 112 may compare the determined amount of movement of the bob 116 to the reference bob movement value. An alert is generated if the amount of movement of the bob 116 is outside of a threshold of the reference bob movement value (block 708). Having the amount of movement of the bob 116 outside of a threshold of the reference bob movement value may indicate that the bob 116 is not operating properly. For example, when the rotor 115 is rotating in air, movement of the bob 116 should be limited (if any). As such, the process 700 of FIG. 7 may be used to determine if the rheometer system 100 of FIG. 1 is operating as expected.

In accordance with a first example, a rheometer system includes a rheometer and a platform supporting the rheometer and movable between a lowered position and a raised position. The rheometer system includes a fluid receptacle defining an opening. The rheometer system includes a receptacle housing having a housing side and adapted to receive the fluid receptacle. The opening of the fluid receptacle facing the rheometer when the fluid receptacle is received by the receptacle housing. The rheometer system includes a thermoelectric device coupled adjacent to the housing side. The rheometer system includes a controller in communication with the thermoelectric device and adapted to control a temperature of the thermoelectric device.

In accordance with a second example, a rheometer system includes a platform movable between a lowered position and a raised position. The rheometer system includes a fluid receptacle defining an opening. The rheometer system includes a receptacle housing having a housing side and adapted to receive the fluid receptacle. The opening of the fluid receptacle faces the platform when the fluid receptacle is received by the receptacle housing. The rheometer system includes a thermoelectric device coupled adjacent to the housing side.

In accordance with a third example, a method includes determining a temperature value within a receptacle housing housing a fluid receptacle during a rheology test. The method includes comparing the determined temperature value to a reference temperature value. The method includes in response to the determined temperature value being outside of a threshold of the reference temperature value, changing the temperature within the receptacle housing using a thermoelectric device coupled adjacent to the receptacle housing to allow a subsequently determined temperature value to be within the threshold of the reference temperature value.

In accordance with a fourth example, a rheometer system includes a fluid receptacle having an opening and a receptacle housing having a housing side and adapted to receive the fluid receptacle. The rheometer system includes a thermoelectric device coupled adjacent to the housing side.

In accordance with a fifth example, a rheometer system includes a receptacle housing having a housing side and adapted to receive a fluid receptacle. The rheometer system includes a thermoelectric device coupled adjacent to the housing side.

In further accordance with the foregoing first, second, third, fourth, and/or fifth examples, an apparatus and/or method may further include any one or more of the following:

In accordance with an example, further including a housing temperature sensor disposed within the receptacle housing.

In accordance with another example, the receptacle housing defines a sensor receptacle and the housing temperature sensor is disposed within the sensor receptacle.

In accordance with another example, further including a heat sink coupled adjacent to the thermoelectric device.

In accordance with another example, further including a heat exchanger including the heat sink, a radiator, and a fan. The heat sink being fluidically coupled to the radiator to allow coolant to flow between the radiator and the heat sink.

In accordance with another example, further including insulation covering the receptacle housing.

In accordance with another example, the insulation defines a hole and the thermoelectric device is positioned adjacent the hole.

In accordance with another example, the receptacle housing has a second housing side opposite the housing side. Further including a second thermoelectric device coupled adjacent to the second housing side. The controller being in communication with the second thermoelectric device and being adapted to control a temperature of the second thermoelectric device.

In accordance with another example, further including a pair of housing temperature sensors. Each housing temperature sensor being disposed within the receptacle housing adjacent a corresponding housing side.

In accordance with another example, further including a guide adapted to guide movement of the platform between the lowered position and the raised position.

In accordance with another example, further including a lock adapted to secure the platform in at least one of the lowered position and the raised position.

In accordance with another example, the lock is coupled to the platform.

In accordance with another example, further a biasing element positioned between the receptacle housing and the platform.

In accordance with another example, further including a fluid receptacle temperature sensor coupled to the platform and arranged to be disposed within the fluid receptacle when the platform is in the lowered position and the fluid receptacle is received by the receptacle housing.

In accordance with another example, further including a housing temperature sensor disposed within the receptacle housing.

In accordance with another example, further including a heat exchanger in thermal communication with the fluid receptacle.

In accordance with another example, the heat exchanger includes a liquid-to-air radiator or an air-to-air radiator.

In accordance with another example, further including changing the temperature within the receptacle housing using the thermoelectric device during a second rheology test.

In accordance with another example, changing the temperature within the receptacle housing using the thermoelectric device coupled adjacent to the receptacle housing includes changing the temperature within the receptacle housing using a pair of thermoelectric devices coupled adjacent opposing sides of the receptacle housing.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:
1. A rheometer system, comprising:
a rheometer;
a platform supporting the rheometer and movable between a lowered position and a raised position;
a fluid receptacle defining an opening;
a receptacle housing having a housing side and adapted to receive the fluid receptacle, the opening of the fluid receptacle facing the rheometer when the fluid receptacle is received by the receptacle housing;
a Peltier thermoelectric device coupled adjacent to the housing side and configured to maintain a temperature of the receptacle housing through conduction; and
a controller in communication with the thermoelectric device and configured to adjust a rate of supply of power to the thermoelectric device and thereby adjustably control a temperature of the thermoelectric device.

2. The rheometer system of claim 1, further comprising:
a housing temperature sensor disposed within the receptacle housing and configured to monitor the temperature of the receptacle housing; and
a fluid receptacle temperature sensor coupled to the platform and arranged to be disposed within the fluid receptacle when the platform is in the lowered position and the fluid receptacle is received by the receptacle housing to monitor a temperature of a fluid within the fluid receptacle.

3. The rheometer system of claim 2, wherein the receptacle housing defines a sensor receptacle and the housing temperature sensor is disposed within the sensor receptacle.

4. The rheometer system of claim 1, further comprising a heat sink coupled adjacent to the thermoelectric device.

5. The rheometer system of claim 4, further comprising a heat exchanger comprising the heat sink, a radiator, and a fan, the heat sink being fluidically coupled to the radiator to allow coolant to flow between the radiator and the heat sink.

6. The rheometer system of claim 1, further comprising insulation covering the receptacle housing.

7. The rheometer system of claim 6, wherein the insulation comprises a hole and the thermoelectric device is positioned adjacent the hole.

8. The rheometer system of claim 1, wherein the receptacle housing has a second housing side opposite the housing side, and further comprising a second Peltier thermoelectric device coupled adjacent to the second housing side, the controller being in communication with the second thermoelectric device and being configured to adjust the rate of supply power to the second thermoelectric device and thereby adjustably control a temperature of the second thermoelectric device.

9. The rheometer system of claim 8, further comprising a pair of housing temperature sensors, each housing temperature sensor being disposed within the receptacle housing adjacent a corresponding housing side.

10. The rheometer system of claim 1, wherein the Peltier thermoelectric device directly contacts the receptacle housing side to conduct heat through the housing side.

11. The rheometer system of claim 1, further comprising a heat transfer paste positioned between the receptacle housing side and the Peltier thermoelectric device for conducting heat from the Peltier thermoelectric device through the receptacle housing side via the heat transfer paste.

12. The rheometer system of claim 11, wherein the Peltier thermoelectric device is configured to maintain the temperature of the receptacle housing based on heating the receptacle housing through conduction.

13. The rheometer system of claim 1, wherein the Peltier thermoelectric device is configured to maintain the temperature of the receptacle housing based on cooling the receptable housing through conduction.

14. The rheometer system of claim 1, wherein the Peltier thermoelectric device is positioned on an exterior of the receptacle housing.

15. A rheometer system, comprising:
a platform movable between a lowered position and a raised position;
a fluid receptacle defining an opening;
a receptacle housing having a housing side and adapted to receive the fluid receptacle, the opening of the fluid receptacle facing the platform when the fluid receptacle is received by the receptacle housing; and
a Peltier thermoelectric device coupled adjacent to the housing side and configured to maintain a temperature of the receptacle housing through conduction; and
a controller in communication with the thermoelectric device and configured to adjust a rate of supply of power to the thermoelectric device and thereby adjustably control a temperature of the thermoelectric device.

16. The rheometer system of claim 15, further comprising a housing temperature sensor disposed within the receptacle housing.

17. The rheometer system of claim 15, further comprising a heat exchanger in thermal communication with the fluid receptacle.

18. The rheometer system of claim 17, wherein the heat exchanger includes a liquid-to-air radiator or an air-to-air radiator.

19. A method, comprising:
determining a temperature value within a receptacle housing housing a fluid receptacle during a rheology test;
comparing the determined temperature value to a reference temperature value; and
in response to the determined temperature value being outside of a threshold of the reference temperature value, changing the temperature within the receptacle housing using a Peltier thermoelectric device coupled adjacent to the receptacle housing and configured to maintain a temperature of the receptacle housing through conduction, the Peltier thermoelectric device in communication with a controller configured to adjust a rate of supply of power to the thermoelectric device and thereby allow a subsequently determined temperature value to be within the threshold of the reference temperature value.

20. The method of claim 19, wherein changing the temperature within the receptacle housing using the thermoelectric device coupled adjacent to the receptacle housing comprises changing the temperature within the receptacle housing using a pair of Peltier thermoelectric devices coupled adjacent opposing sides of the receptacle housing.

* * * * *